(12) United States Patent
Engström (10) Patent No.: US 8,175,601 B2
(45) Date of Patent: May 8, 2012

(54) METHOD OF DETECTING INCORRECT CELL IDENTITY IN WIRELESS COMMUNICATION SYSTEMS

(75) Inventor: Stefan Engström, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 83 days.

(21) Appl. No.: 12/747,734

(22) PCT Filed: Dec. 12, 2007

(86) PCT No.: PCT/SE2007/050978
§ 371 (c)(1),
(2), (4) Date: Jun. 11, 2010

(87) PCT Pub. No.: WO2009/075620
PCT Pub. Date: Jun. 18, 2009

(65) Prior Publication Data
US 2010/0267373 A1    Oct. 21, 2010

(51) Int. Cl.
*H04W 36/00* (2009.01)
*H04W 4/00* (2009.01)
(52) U.S. Cl. .................. 455/436; 455/442; 370/331

(58) Field of Classification Search .......... 455/436–444; 370/331–334
See application file for complete search history.

(56) References Cited

U.S. PATENT DOCUMENTS

| 6,285,874 | B1 * | 9/2001 | Magnusson et al. | 455/456.1 |
| 2007/0206537 | A1 * | 9/2007 | Cam-Winget et al. | 370/331 |
| 2008/0318575 | A1 * | 12/2008 | Ulupinar et al. | 455/436 |

* cited by examiner

*Primary Examiner* — Michael Thier (57) ABSTRACT

By transmitting the Measurement cell identity (MCI), in addition to the PCI PLMN cell identity (PCI), in a request to a node, an MCI to PCI mismatch is early discovered by the node and reported to the source eNode B. The handover procedure can be aborted in an earlier stage, saving time and resources. The node can then also include information in the response to the source eNode B, which makes it possible for the source eNode B to blacklist MCIs and MCI to PCI combinations. This way faulty or faked MCIs or PCIs can be discovered already in the source eNode B, saving even more time and resources.

17 Claims, 9 Drawing Sheets

PRIOR ART

METHOD OF DETECTING INCORRECT CELL IDENTITY IN WIRELESS COMMUNICATION SYSTEMS

TECHNICAL FIELD

The present invention relates in general to radio communications and in particular to a method and a device for detecting fake cell identity in wireless communication systems.

BACKGROUND

Wireless communication networks are well known and increasing in popularity. Mobile terminals, such as cell phones, wirelessly communicate through base stations or node B's in WCDMA that are associated with different cells or sectors in a geographic region, for example. With the increasing popularity and increased competition in wireless communications, system reliability and availability to the end user, is increasingly important.

Figure 1:
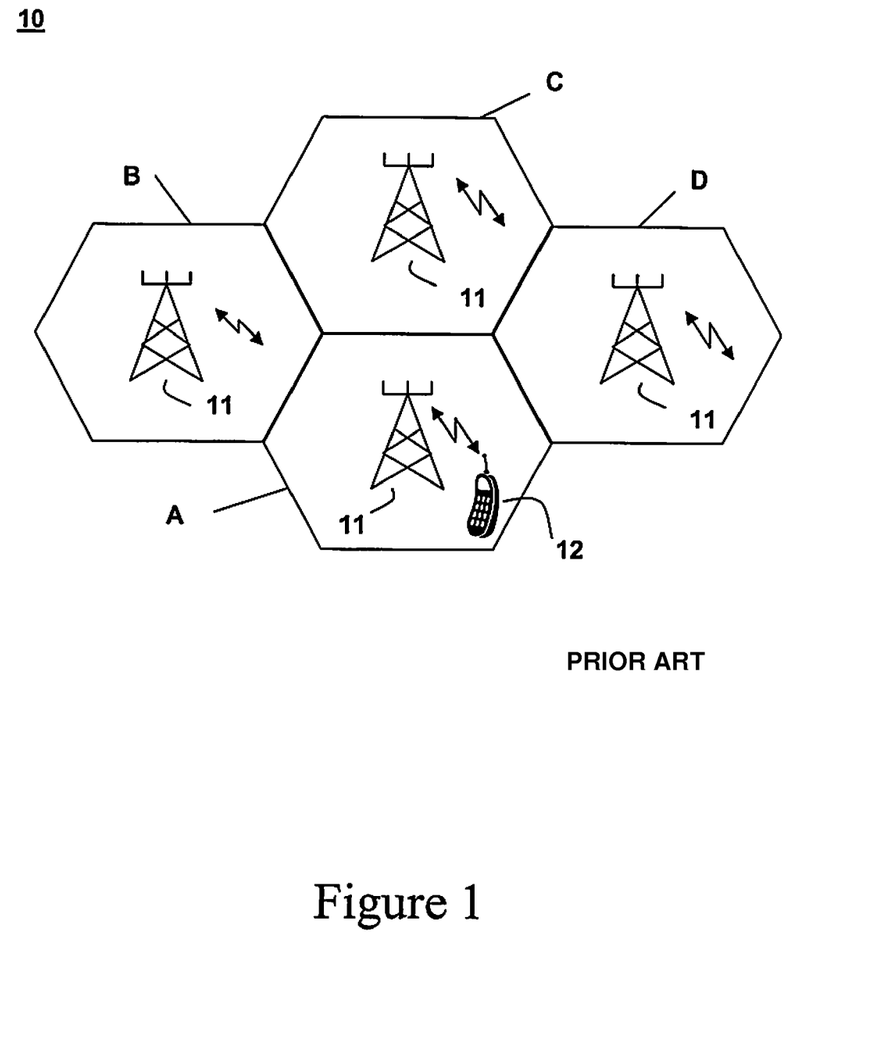
FIG. 1 is a schematic view of a cellular communications network.

FIG. 1 illustrates a wireless telecommunication network which defines a number of communication cells (A,B,C,D) each of which is served by a radio base station 11. Each communication cell covers a geographical area, and by combining a number of cells a wide area can be covered. A mobile terminal 12 is illustrated communicating in cell A, and is able to move around in the system 10.

A base station 11 contains a number of receivers and transmitters to give radio coverage for one or more cells. Each base station is connected to network backbone, or core network infrastructure (not shown), which enables communication between base stations and other networks. The example system of FIG. 1 shows one base station per cell.

An important concept in such a system is the cell and its neighbours. During a call a mobile terminal typically moves around among the cells; moving from one to one of its neighbours, repeatedly. A list of known neighbours, the so-called "neighbour cell list" is important for the network to enable reliable handover between cells of a mobile terminal. The purpose of neighbour cell lists is to allow the base stations to give their connected mobile terminals a defined set of cells to measure on.

In existing system like GSM or W-CDMA, the neighbour cell list is broadcasted from the base station to the mobile terminal. The mobile terminal detects cell operating parameters for neighbouring cells. The mobile terminal measures the operating parameters of each neighbour cell and reports those back to the network. When the quality of neighbour cell is considered better than the current serving cell, a handover from the serving cell to the target cell is triggered. The target cell becomes the serving cell for the mobile terminal. The target cell is the neighbour cell having a better quality than the current serving cell.

In Long Term Evolution (LTE) which is a project within the Third Generation Partnership Project to improve the UMTS mobile phone standard to cope with future, the purpose of the neighbour cell lists has been changed as the mobile terminal also referred to as User Equipment (UE) is assumed to decode any Measurement Cell Identity (MCI) on a given frequency. For this reason, neighbour cell lists will not be needed as instructions for the UE to perform measurements. However, there is still a need for each base station to have neighbour cell lists defined, as the base station needs to manage to which neighbour base stations an interface needs to be maintained.

The MCI is a layer 1 identifier for a cell. The MCI is an integer, not long enough to be unique for a Radio Access Network (RAN). When planning the LTE Radio Access Network (RAN), each cell in the network is assigned an MCI. It is assumed that the MCI will have 510 unique values and the MCIs will be reused several times in a large network. The MCIs are distributed so one cell has no neighbour cell with the same MCI as itself and does not have two neighbour cells with the same MCI.

To address the target cell within the Public Land Mobile Network (PLMN) a Cell Identity PLMN (CIPL) is used. The CIPL is a layer 3 identifier for a cell and unique for a cell within the PLMN, typically within a country, or even globally. To establish an interface between a first and second base stations the CIPL is used by the first base station to lookup a transport layer address to the second base station. The lookup could e.g. be performed by a request to a Domain Name System (DNS) name server, which translates the CIPL to the Internet Protocol (IP) address of the second base station and returns the IP address to the first base station.

To prepare for handover between two cells, the UE performs measurements on the received power or signal quality from neighbour cells. The measurement results are reported to the base station and the neighbour cells are identified by a measurement cell identity (MCI) that the UE has received over the air. A handover request is sent from the source cell to the target cell. This request is sent to request resources in the target cell for the UE to be handed over. The target cell then responds with what resources that have been allocated or denies access for the UE.

An automatic, UE assisted, neighbour cell update is being designed for LTE. The UE can here report MCIs for neighbour cells that are unknown to the base station. When this happens, the base station asks the UE to listen to the broadcast channel of the unknown neighbour and report back the CIPL of the neighbour. When the CIPL is known to the base station, the base station can establish communication to the new neighbour.

In the automatic neighbour cell update and in the handover process, the system is vulnerable to UEs reporting faked MCIs and CIPLs to the base station. Consequently, this leads to unnecessary processing, signalling and reservation of resources in target base stations that are not released before the handover later is timed out Hence there exist a need for a method and arrangements for protecting against UEs reporting fake neighbour cell identity.

SUMMARY

A problem with the wireless communication networks, that use UE supported data for configuration, is that they are vulnerable to UEs reporting faked data, e.g. cell identity.

A general object of the present invention is to provide improved methods and arrangements for detecting fake cell identity.

A further object of the present invention is to provide a method for enabling a base station to detect reported fake cell identities.

These and other objects are achieved in accordance with the attached set of claims.

A first embodiment of the present invention provides a method for enabling a first base station to detect fake cell identity in a wireless communication system having a plurality of base stations, wherein the first base station supports a first cell, receives a first and a second cell identity relating to a second cell from a mobile station, transmits at least one of the received first and second cell identity to a node and interrupts the mobile station from performing handover to the second cell upon receiving a message from the node indicating the invalidity of one of the cell identities or a mismatch between the first and the second cell identity.

Another embodiment of the present invention provides a base station for detecting fake cell identity in a wireless communication system having a plurality of base stations, wherein said base station comprises a transceiver, a network interface and a controller unit. Said transceiver receives a first and a second cell identity relating to a second cell from a mobile station, wherein said interface transmits at least one of the received first and second cell identity to a node and said controller unit interrupts the mobile station from performing handover to the second cell upon receiving a message from the node indicating the invalidity of one of the cell identities or a mismatch between the first and the second cell identity.

An advantage of the present invention comprises enabling of a base station to detect fake cell identities. Since the detecting method is performed at an early handover stage, i.e. before allocating resources, resources can be allocated to other mobile station that requests service and with that increasing the profitability of the operator.

Another advantage is that the signalling performed as a result of the fake identities, MCI or CIPL, resulting in extra load on processing entities and transport links is minimized.

BRIEF DESCRIPTION OF THE DRAWINGS

The present invention will now be described in more by way of non-limiting examples and with reference of the accompanying drawings, in which.

DETAILS DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. The technology is described in the context of a Long Term Evolution (LTE) of UMTS in order to provide an example and a non-limiting context for explanation. The ideas of the present invention are equally applicable to many types of cellular systems consisting of a plurality of base stations, where detection of fake cell identity is necessary.

In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Generally, the present invention is applicable to various communications system. Universal Mobile Telecommunications System (UMTS) is one of the third-generation (3G) mobile phone technologies. Currently, the most common form uses W-CDMA as the underlying air interface, is standardized by the 3rd Generation Partnership Project (3GPP), and is the European answer to the ITU IMT-2000 requirements for 3G cellular radio systems. The Long Term Evolution (LTE) of UMTS is under discussion by the 3GPP which standardized UMTS. The objective of the LTE work is to develop a framework for the evolution of the 3GPP radio-access technology towards a high-data-rate, low-latency and packet-optimized radio-access technology. So the focus is on supporting services provided from the packet switched (PS)-domain. LTE is explained as one example of the various communication systems, to which the present invention is applicable, in the following description.

Figure 2:
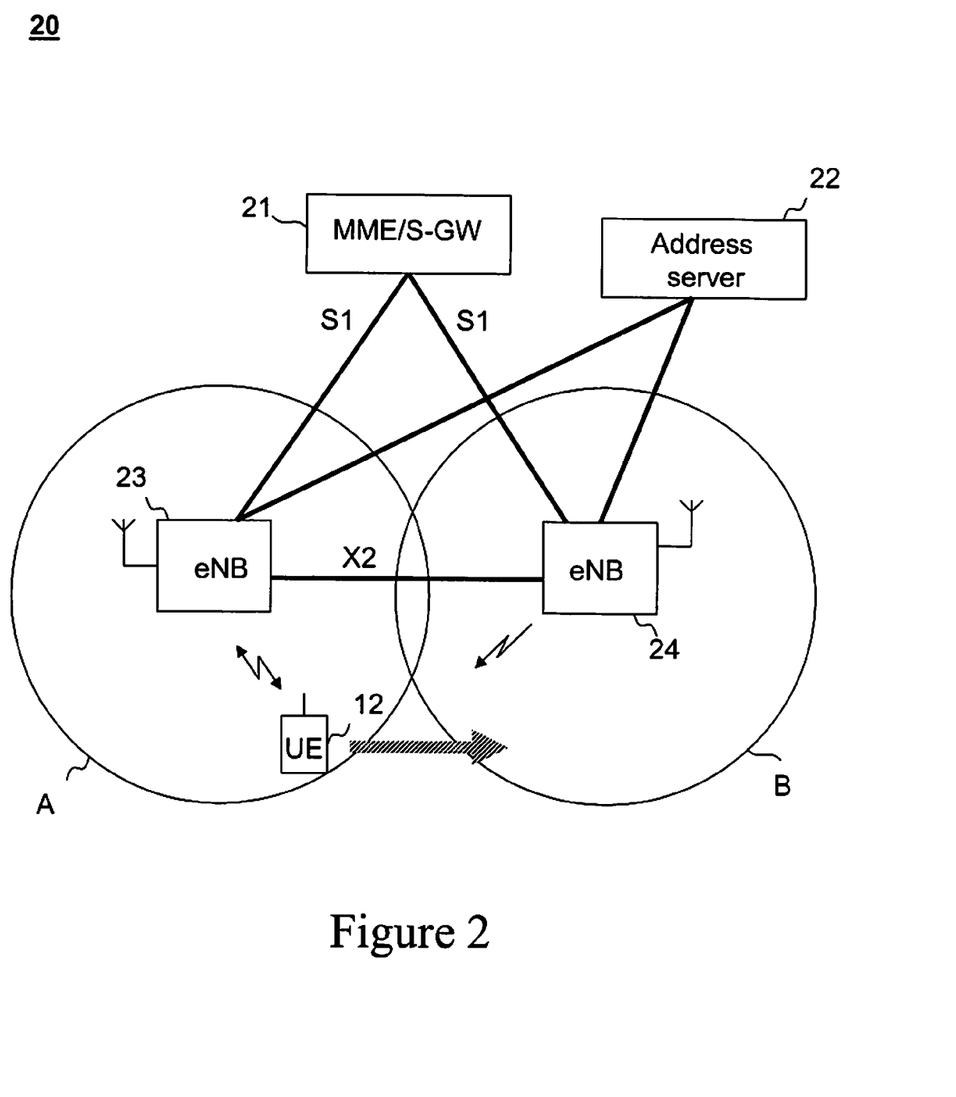
FIG. 2 is a schematic view of a cellular communication system according to the invention.

FIG. 2 illustrates an LTE system 20, sometimes referred to as evolved-UTRAN (e-UTRAN). The LTE system includes Base Stations which are referred to as evolved Node B's (eNode B's) because of the additional functionality performed by the base stations as compared to regular UTRAN base stations. The eNode B's 23 and 24 communicate together over an X2 interface. The eNode B's 23 and 24 communicate over an S1 interface with an evolved packet core (EPC) which includes one or more nodes labelled as mobility management entity (MME)/Serving Gateway (S-GW) 21 and with an address server 22.

The eNode B 23 communicates over the radio/air interface with UE 12. A plurality of cells or sectors includes eNode B's that are geographically distributed in a known manner. The portion of the example system that is illustrated in FIG. 2 includes two cells A and B.

A source eNode B is a base station providing coverage for a cell that is the serving cell for the UE. In FIG. 2, the source eNode B is identified as eNode B 23 and the serving cell is cell A. When a handover is being considered from this cell, it can be referred to as the source cell for the handover. While the UE has a radio communication link with the eNode B 23, it is also making measurements on transmission from other eNode B, i.e. eNode B 24 in FIG. 2. These measurements are shown as a broken arrow in cell B. The UE 12 reports neighbouring cell information to the eNode B 23 with which it is communicating. This measurement report can be event triggered or periodic indicating the cell B controlled by eNode B 24, having a non-unique cell identity (MCI), as a handover candidate. In the context of the handover from the source eNode B 23 to the second cell B, this second cell B can be referred to as the target cell B.

The reported measurements include among others the MCI, the received power measured and the received quality measured of eNode B 24. The measurements are needed among other to perform handover from a source cell A to target cell B.

An event triggered measurement report typically follows an evaluation by the UE 12 that the signal strength (or some alternative parameter) of the target cell B exceeds the signal strength of the source cell A by some threshold, for example 3 dB, and thus a handover to the target cell B should be performed. The UE 12 is capable of detecting the non-unique cell identity information MCI, in the transmission from the target eNode B 24. The source eNode B 23 determines whether unique cell identity information, such as CIPL, is available for the cell identified in the received measurements report. This availability is ascertained by determining whether the unique cell identity CIPL exists in a neighbour cell list which includes an identity map relating non-unique cell identity MCI information to unique cell identity CIPL information. If the CIPL is available in the source eNode B, the source eNode B is able to send a handover request to the target eNode B to reserve resources in the target cell eNode B for the UE.

It should be noted that the eNode B uses the neighbouring cell information from one or more UEs to form its neighbour cell list, which is typically used as the neighbour cell list for all UEs that are active in the cell.

In normal cases, the MCI is known to the source cell eNode B 23 which will be able to translate the received MCI to a CIPL and a valid network address in order to contact the target cell eNode B 24 and ask for resources to be made available to the UE 12 after the handover. However, if the MCI is unknown to the source cell eNode B 23, i.e. the source cell eNode B 23 has no translation to a CIPL for the UE 12 detected MCI, the source cell eNode B 23 is capable of instructing the UE 12 to decode the neighbouring cell's eNode B 24 broadcast and read the CIPL. When the UE 12 has found the neighbouring cell's CIPL, the UE reports the detected CIPL to the source cell eNode B 23.

As discussed above the MCI is a layer 1 identifier for a cell. The MCI is an integer, not long enough to be unique for a Radio Access Network (RAN). When planning the LTE Radio Access Network (RAN), each cell in the network is assigned an MCI. The MCIs are distributed so one cell has no neighbour cell with the same MCI as itself and does not have two neighbour cells with the same MCI. To address the target cell within the Public Land Mobile Network (PLMN) a Cell Identity PLMN (CIPL) is used. The CIPL is a layer 3 identifier for a cell and unique for a cell within the PLMN, typically within a country, or even globally. To establish an interface between a first and a second base station the CIPL is used by the first base station to lookup a transport layer address to the second base station. The lookup could e.g. be performed by a request to an address server 22, which translates the CIPL to the Internet Protocol (IP) address of the neighbouring eNode B and returns the IP address to the first eNode B. One example of an address server is a Domain Name System (DNS) name server.

One skilled in the art realizes that the infrastructure depicted in FIG. 2 may further include other network elements, such as one or more gateways and one or more address server. FIG. 2 is provided merely to illustrate the principles of the present invention and is not intended to be an exclusive depiction of communication system 20.

Figure 3:
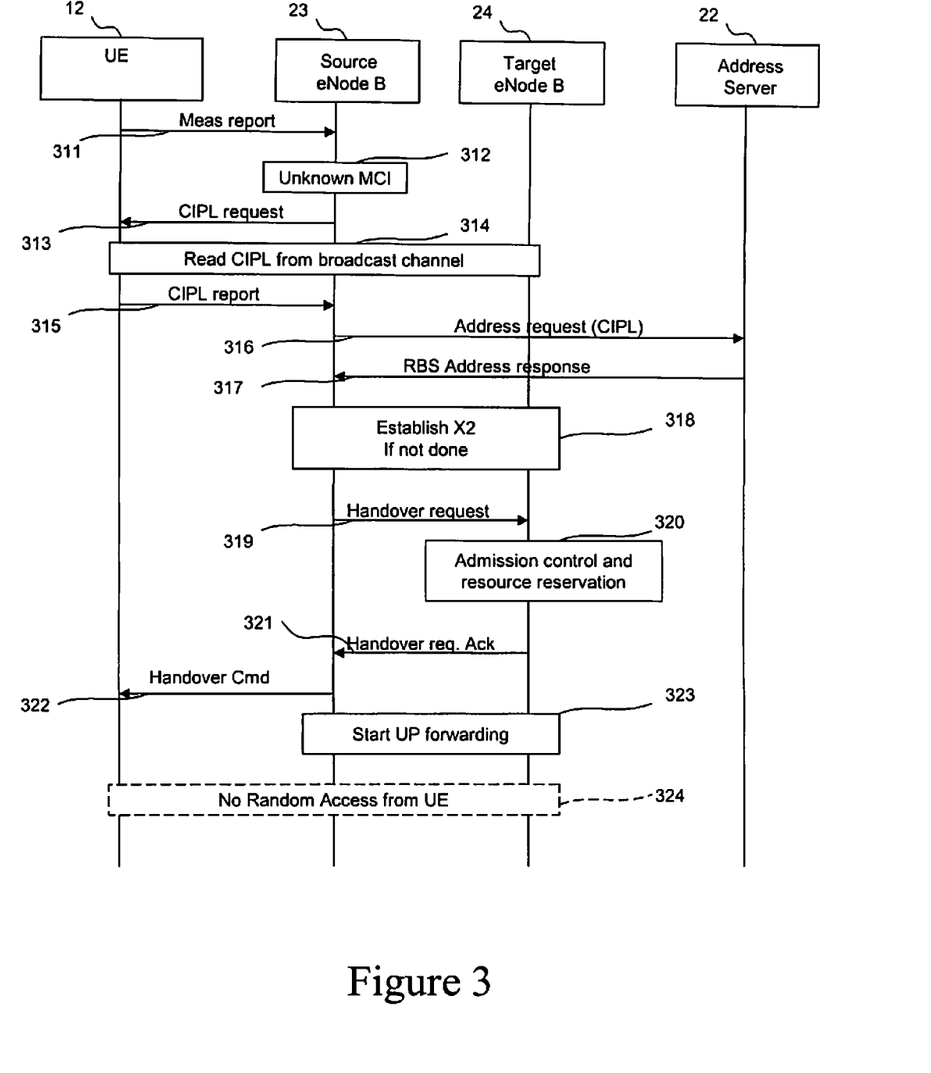
FIG. 3 is a schematic signalling diagram according to the prior art.

FIG. 3 illustrates a signalling diagram according to the prior art. The UE 12 sends a measurement report 311 regarding the target eNode B 24 to the source eNode B 23. This report contains the MCI of the target eNode B 24. If the MCI is unknown 312 to the source eNode B 23, i.e. the neighbouring cell list does not include the reported MCI, the source eNode B 23 instructs the UE 12, using the newly discovered MCI, to read the CIPL 313 of the target eNode B 24. When the UE has found out the CIPL 314 of the target eNode B 24, the UE 12 reports the detected CIPL 315 to the source eNode B 23. The source eNode B 23 sends an address request 316 using the received CIPL to the address server 22. The address server sends back a transport layer address of the target eNode B 24 to the source eNode B 23. If an X2 interface is not already established between the source eNode B 23 and the target eNode B 24, the source eNode B 23 sets up a new X2 interface 318 towards the target eNode B 24 and updates its neighbouring cell list to include the newly discovered MCI and CIPL. To perform handover to the target eNode B 24, the source eNode B 23 sends a handover request 319 to the target eNode B 23. The target eNode B 23 performs an admission control and resource reservation 320 to allocate resources to the UE 12. If resources are available and allocated to the UE a handover request acknowledge 321 is sent to the source eNode B 23, which in it's turn sends a handover command 322 to the UE to start the handover process and starts User Plane (UP) forwarding payload 323 to the target eNode B 24. In case where the UE 12 reports a fake MCI or CIPL to the source eNode B 23, the source cell eNode B 23 will contact the wrong target cell eNode B 24 and asks for resources to be allocated to the UE. As the reported MCI or CIPL are faked, the UE does not perform handover 324 and the allocated resources in the target eNode B 24 are not released before the handover is timed out.

As described in the background, the purpose of neighbour cell lists in LTE eNode B is to manage to which neighbour eNode Bs a connection using X2 interface needs to be maintained. When the UE reports an unknown MCI to the source eNode B, the source eNode B asks the UE to read the CIPL and reports it back to the source eNode B. In its turn the source eNode B stores the MCI and its corresponding CIPL in the neighbour cell lists for future use. The neighbour cell list, maintained in the source eNode B, may also include other parameters for example power thresholds for handover and IP addresses of the neighbouring eNode Bs.

Figure 4:
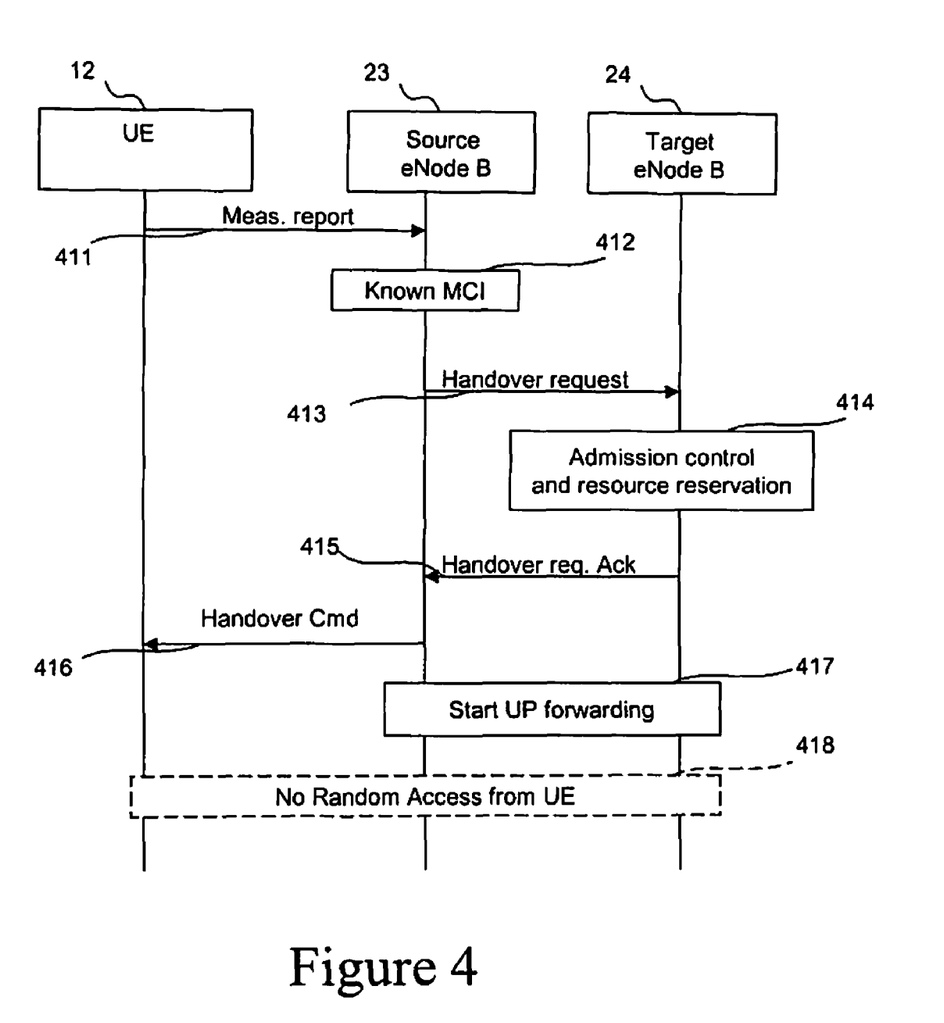
FIG. 4 is a second schematic signalling diagram according the prior art.

FIG. 4 illustrates a second signalling diagram according to the prior art. The UE 12 sends a measurement report 411 regarding the target eNode B 24 to the source eNode B 23. This report contains the MCI of the target eNode B 24. If the MCI is known 412 to the source eNode B 23, i.e. the reported MCI is included in the neighbouring cell list and the corresponding transport layer address of the target eNode B 24 is known, the source eNode B 23 sends a handover request 413 to the target eNode B 24. The target eNode B 24 performs an admission control and resource reservation 414 to allocate resources to the UE 12. If resources are available and allocated to the UE a handover request acknowledge 415 is sent to the source eNode B 23, which in its turn sends a handover command 416 to the UE 12 to start the handover process and starts User Plane (UP) forwarding payload 417 to the target eNode B 24. In case where the UE 12 reports a fake MCI or CIPL to the source eNode B 23, the source cell eNode B 23 will contact the wrong target eNode B 24 and ask for resources to be allocated to the UE. As the wrong target eNode B 24 is contacted, the UE does not perform handover 418 and the allocated resources in the target eNode B 24 are not released before the handover is timed out.

Not releasing the allocated resources before the handover is timed out prevents the target eNode B from allocating its resources to other UEs that request service in the target cell. Also the signalling performed as a result of the fake identities, MCI or CIPL, results in extra load on processing entities and transport links. Both effects decrease the profitability of the operator.

Figure 5:
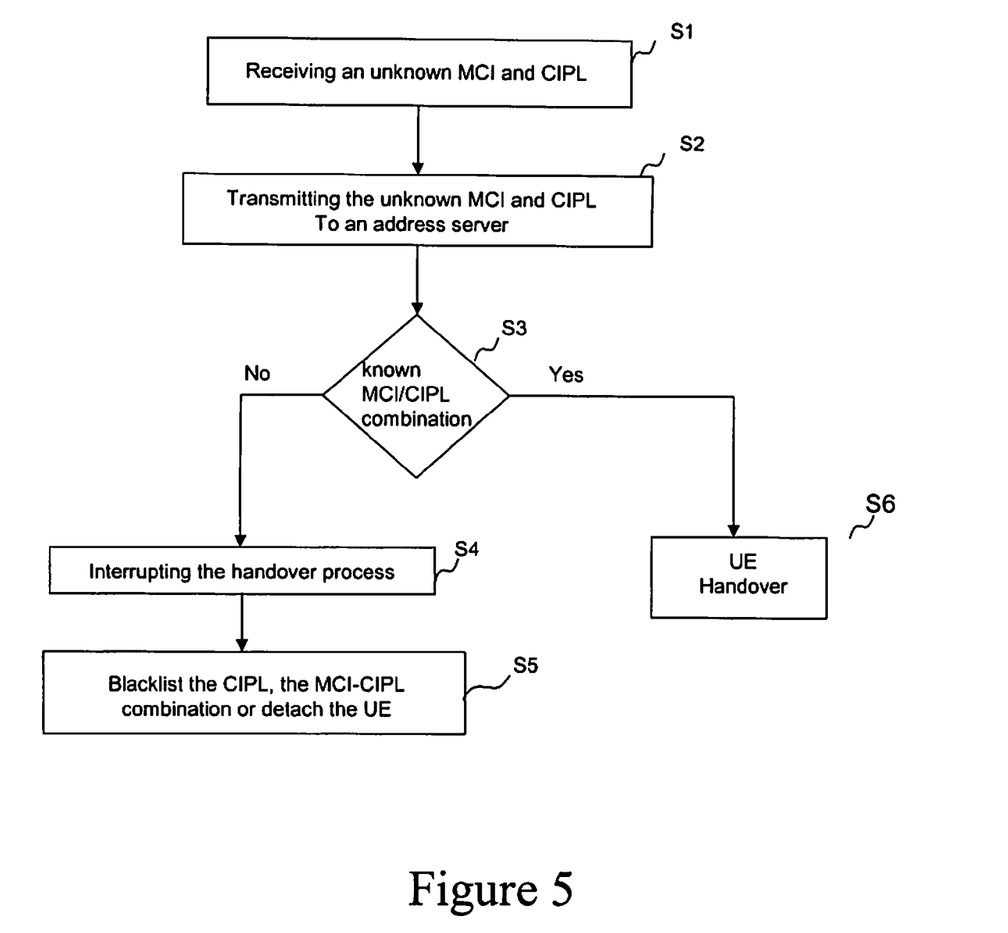
FIG. 5 is a flow diagram according to one embodiment of the invention.

FIG. 5 is a schematic flow diagram that illustrates an example, non-limiting procedures for detecting fake cell identity reported to a source eNode B. At step S1 the UE reports neighbouring cell information to the eNode B with which it is communicating, i.e. the source cell eNode B. The neighbouring cell information includes unknown MCI and CIPL. As the MCI is not related to any target eNode B in the source eNode B, the MCI and CIPL are transmitted to a node, preferably to an address server S2 to be checked. At the address server it is determined whether the MCI-CIPL combination is allowed or not S3. If the address server reports a matching MCI-CIPL combination, the source e-node B establishes an X2 connection with the newly identified target eNode B, reserves resources in the target eNode B and sends a handover command to the UE S6. However if the address server reports an invalid CIPL or mismatching MCI-CIPL combination, the source eNode B interrupts S4 the handover process and blacklist the CIPL, MCI-CIPL combination or requests the UE S6 to be detached. If the address server reports the CIPL as invalid, the CIPL is blacklisted in the eNode B and if the same CIPL is reported again by any UE, no request is sent to the address server, but the handover is immediately aborted by the source eNode B. If the address server reports the MCI-CIPL combination as a mismatch, the MCI-CIPL combination is blacklisted in the eNode B and if the same MCI-CIPL combination is reported again by any UE, no request is sent to the address server, but the handover is immediately aborted by the source eNode B. To allow adaptation to changes in the network, e.g. new CIPLs and MCIs being added, the blacklisting can automatically be removed after a specified period of time.

Figure 6:
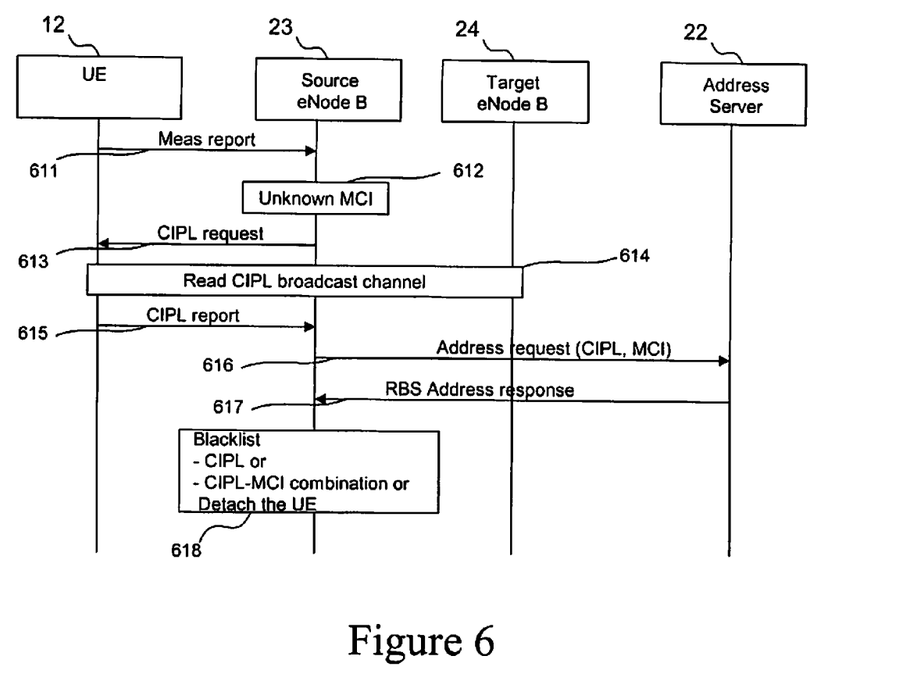
FIG. 6 is a signalling diagram according to one embodiment of the invention.

FIG. 6 illustrates a signalling diagram according to one embodiment of the invention. The UE 12 sends a measurement report 611 regarding the target cell B to the source eNode B 23. This report contains the MCI of the target cell B. If the target eNode B of the MCI is unknown 612 to the source eNode B 23, i.e. the reported MCI is not included in the neighbouring cell list the source eNode B 23 instructs the UE 12, using the newly discovered MCI, to read the CIPL 613 of the target cell B. When the UE has found out the CIPL 614 of the target cell B, the UE 12 reports back the detected CIPL 615 to the source eNode B 23. The source eNode B 23 sends an address request 616 using the received MCI and CIPL to the address server 22. By sending the MCI and CIPL to the address server 22, the faulty MCI-CIPL combination or an invalid CIPL is detected and reported back 617 to the source eNode B 23. The source eNode B 23 blacklists 618 the MCI-CIPL combination in case of faulty MCI-CIPL combination reported by the address server or blacklists the CIPL in case of an invalid CIPL reported back by the address server 22. If the UE 12 continues to report a number of different and faulty MCI-CIPL combinations or invalid CIPLs, the serving eNode B23 requests the Mobility Management Entity (not shown) to detach the UE 12. The blacklisting and detach requests are indicated to the Network Management System (not shown), to facilitate automatic or manual action to e.g. correct faulty MCI or CIPL configurations or take action on misbehaving UEs.

Figure 7:
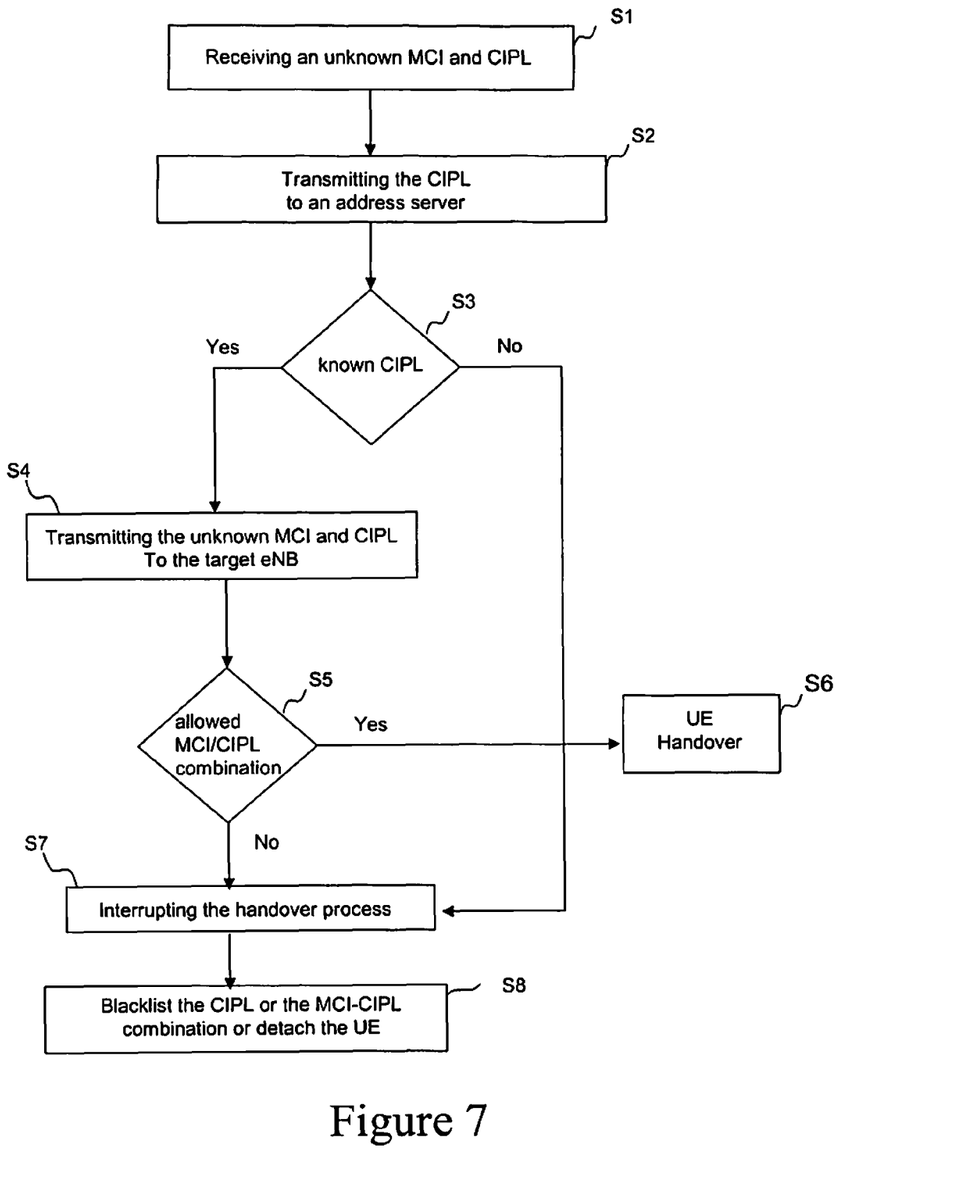
FIG. 7 is a flow diagram according to another embodiment of the invention.

FIG. 7 is a schematic flow diagram that illustrates another example, non-limiting procedures for detecting fake cell identity reported to a source eNode B. At step S1 the UE reports neighbouring cell information to the eNode B with which it is communicating, i.e. the source cell eNode B. The neighbouring cell information includes unknown MCI and CIPL. As the target eNode B of the MCI is unknown to the source eNode B, the CIPL is transmitted to an address server S2 to be checked. At the address server it is determined whether the CIPL is valid or not S3. If the address server reports to the source eNode B that the CIPL is not known, the source eNode B interrupts the handover S7 and blacklists the CIPL S8. If the address server reports a valid CIPL, the source e-node B establishes an X2 connection with the newly identified target eNode B and sends a handover request including the MCI and CIPL to the target eNode B. If it is determined at the target eNode B that the MCI-CIPL combination is allowed, the source eNode B sends a handover command to the UE S6. However if the target eNode B reports a mismatching MCI-CIPL combination, the source eNode B interrupts S7 the handover process and blacklist the MCI-CIPL combination. If the UE continues to report a number of different and faulty MCI-CIPL combinations or a number of different and faulty CIPLs, the serving eNode B requests the Mobility Management Entity to detach the UE.

Figure 8:
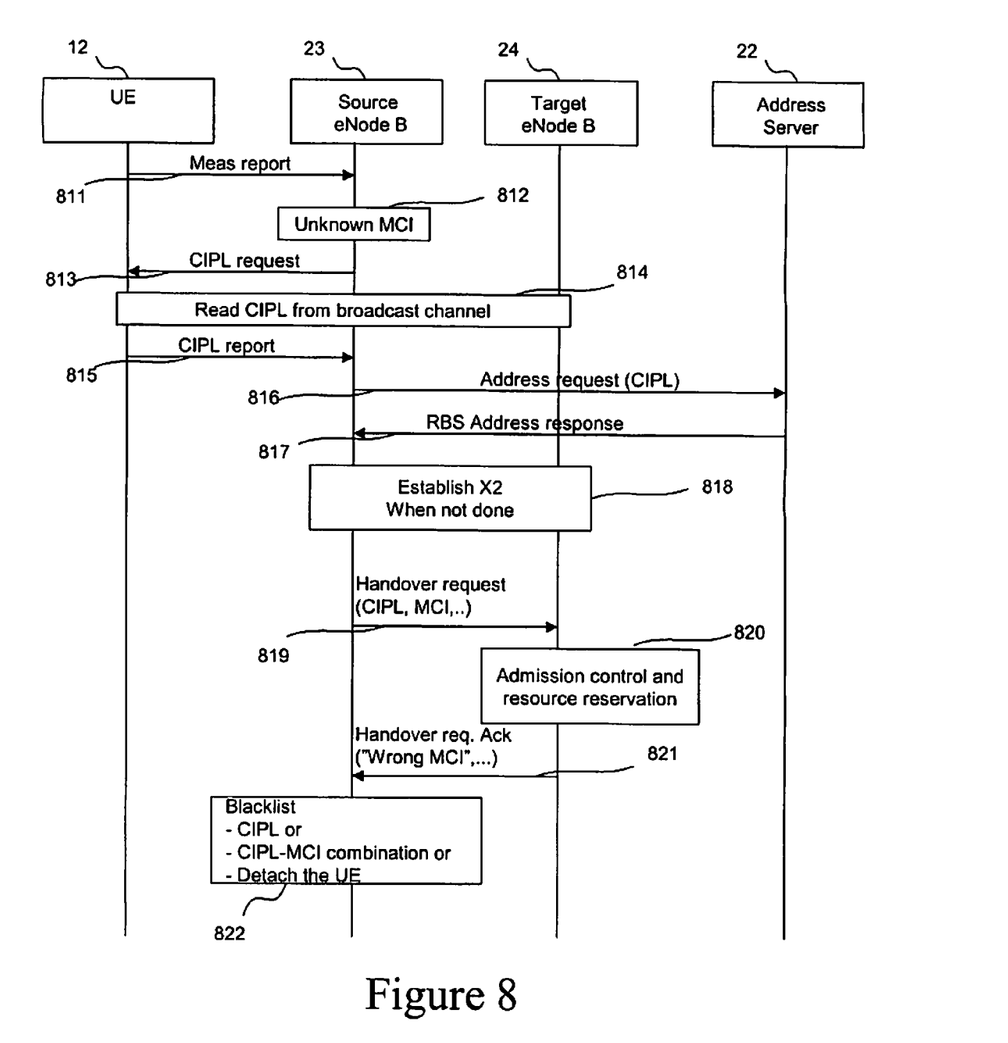
FIG. 8 is a signalling diagram according to another embodiment of the invention.

FIG. 8 illustrates a signalling diagram according to another embodiment of the invention. The UE 12 sends a measurement report 811 regarding the target eNode B 24 to the source eNode B 23. This report contains the MCI of the target eNode B 24. If the MCI is unknown 812 to the source eNode B 23, i.e. the reported MCI is not included in the neighbouring cell list, the source eNode B 23 instructs the UE 12, using the newly discovered MCI, to read the CIPL 813 of the target eNode B 24. When the UE has found out the CIPL 814 of the target eNode B 24, the UE 12 reports back the detected CIPL 815 to the source eNode B 23. The source eNode B 23 sends an address request 816 using the received CIPL to the address server 22. By sending the CIPL to the address server 22, an unknown CIPL is detected and reported back 817 to the source eNode B 23. When the address server 22 has no knowledge of the MCI-CIPL combinations, the address server 22 cannot verify MCI-CIPL combinations but only check the validity of the CIPL. When the CIPL is valid in the address server, the eNode B 23 establishes a connection 818 with the target eNode B 24 using the X2 interface. When the connection is established the source eNode B 23 sends a handover request 819 including the MCI and CIPL of the target eNode B 24. When the target eNode B 24 detects a wrong MCI-CIPL combination, it reports 821 this back to the source eNode B 23. The handover is then interrupted by the source eNode B 23 which blacklists 822 the MCI-CIPL combination in case of faulty MCI-CIPL combination reported by the target eNode B 24 or blacklists the CIPL in case of a wrong CIPL is reported back from the address server 22. If wrong CIPL is reported back by the address server, the X2 establishment and resource reservation 818-821 is not performed. If the UE 12 continues to report a number of different and faulty MCI-CIPL combinations or a number of different and faulty CIPLs, the serving eNode B 23 requests the Mobility Management Entity (not shown) to detach the UE 12.

Figure 9:
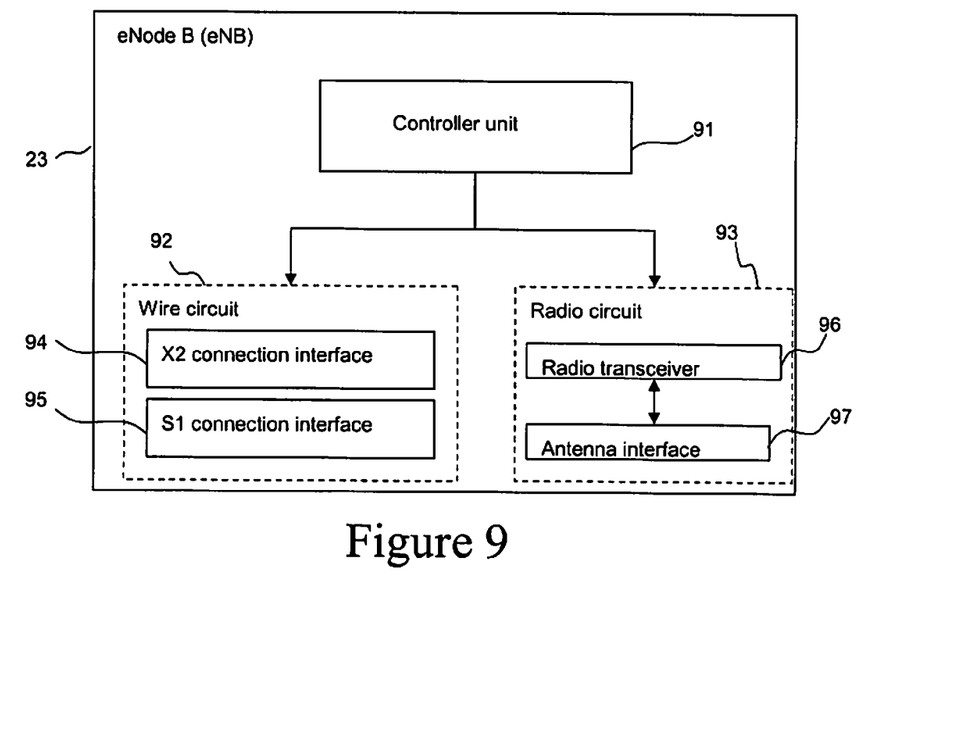
FIG. 9 is a function block diagram of a non-limiting example of base station for detecting fake cell identity according to the invention.

FIG. 9 is a function block diagram of a non-limiting example of an eNode B 23 adapted to detect faulty cell identity in accordance, for example, with the procedures described above. The eNode B includes a controller 91, a wired circuit 92 having a X2 connection interface 94 and an S1 connection interface 95, and a radio circuit 93 having a radio transceiver 96 coupled to an antenna interface 97. The controller 91 handles the data processing of detect fake cell identity associated with the reception of an unknown MCI. The X2 connection interface 94 is adapted to receive and transmit information on the X2 connection. The S1 connection interface 95 is adapted to receive and transmit information on the S1 connection. The radio transceiver 96 performs the baseband processing, filtering, frequency translation, amplification, and other operations necessary for radio communication.

The controller unit 91 receives and transmits detecting cell identity-related messages such as measurement requests and reports, address request and reports and also performs detecting operations such as fault detection process. The received measurement reports may include as an example the identities of the target eNode B (MCI and CIPL) and UE quantities measurements such as the received power measured, the received quality measured and the total received power measured, to be used by the controller unit in the handover process. The controller unit is also used to update the neighbour cell list by adding new cells, deleting cells or blacklisting cell identities. Blacklisting is used for example to prohibit certain cell relations and to avoid unnecessary resource allocation.

The present invention may be embodied in many different forms and should not be construed as limited to the embodiments set forth herein; rather, these embodiments are provided so that this disclosure will be thorough and complete, and will fully support the enclosed set of claims.

The invention claimed is:

1. A method at a first base station supporting a first cell for detecting a fake cell identity in a wireless communication system having a plurality of base stations, the method comprising the steps of:
   receiving a first and a second cell identity relating to a second cell from a mobile station;
   transmitting at least one of the received first and second cell identity to a node, wherein said node is an address server;
   establishing a connection with a second base station upon receiving a message from the node indicating the validity of the second cell identity;
   transmitting to the second base station the received first and second cell identity in a handover request; and
   interrupting the mobile station to perform handover to the second cell upon receiving a message from the node indicating invalidity of one of the cell identities or receiving a message from the node indicating a mismatch between the first and the second cell identity or upon receiving a message from the second base station indicating a mismatch between the first and second cell identity.

2. The method as claimed in claim 1, wherein the second cell identity relating to the second cell is received in response to a request transmitted to the mobile station.

3. The method as claimed in claim 2, wherein the request transmitted to the mobile station is generated upon receiving an unknown first cell identity.

4. The method as claimed in claim 1, wherein the second cell is supported by the second base station.

5. The method as claimed in claim 1, further comprising the step of:
   blacklisting the second cell identity, the first and second cell identity combination or requesting detach of the mobile station from the wireless communication system, in response to a certain number of handover interruptions.

6. The method as claimed in claim 1, wherein the first cell identity is the Measured Cell Identity.

7. The method as claimed in claim 1, wherein the second cell identity is the Public Land Mobile Network Cell Identity.

8. The method as claimed in claim 1, further comprising the step of:
   reporting a blacklisting of the second cell identity, the first and second cell identity combination or request for detach of the mobile station to a network management system.

9. A base station for detecting a fake cell identity in a wireless communication system, wherein said base station is adapted to support a first cell and said base station comprising:
   a radio transceiver adapted to receive a first and a second cell identity relating to a second cell from a mobile station;
   a network interface adapted to transmit at least one of the first and second cell identity to a node, wherein the node is an address server; and a controller unit, coupled to said transceiver and interface, and adapted to:
      establish a connection with a second base station upon receiving a message from the node indicating the validity of the second cell identity,
      transmit to the second base station the received first and second cell identity in a handover request, and
      interrupt the mobile station from performing handover to the second cell upon receiving a message from the node indicating invalidity of one of the cell identities or receiving a message indicating a mismatch between the first and the second cell identity.

10. The base station as claimed in claim 9 wherein the transceiver is adapted to receive the second cell identity relating to the second cell in response to a request transmitted to the mobile station from said transceiver.

11. The base station as claimed in claim 10, wherein the request transmitted to the mobile station is generated upon receiving an unknown first cell identity.

12. The base station as claimed in claim 9, wherein the second cell is supported by the second base station.

13. The base station as claimed in claim 12, wherein said node is identical to the second base station.

14. The base station as claimed in claim 9, wherein the controller is further adapted to blacklist the second cell identity, the first and second cell identity combination or to request detach of the mobile station from the wireless communication system, in response to a certain number of handover interruptions.

15. The base station as claimed in claim 9, wherein the first cell identity is the Measured Cell Identity.

16. The base station as claimed in claim 9, wherein the second cell identity is the Public Land Mobile Network Cell Identity.

17. The base station as claimed in claim 9, wherein the controller is further adapted to report a blacklisting of the second cell identity, the first and second cell identity combination or request for detach of the mobile station to a network management system.

* * * * *

UNITED STATES PATENT AND TRADEMARK OFFICE
CERTIFICATE OF CORRECTION

PATENT NO.         : 8,175,601 B2
APPLICATION NO.    : 12/747734
DATED              : May 8, 2012
INVENTOR(S)        : Engström Page 1 of 1

It is certified that error appears in the above-identified patent and that said Letters Patent is hereby corrected as shown below:

In Column 2, Line 42, delete "out" and insert -- out. --, therefor.

In Column 3, Line 36, delete "according" and insert -- according to --, therefor.

In Column 3, Line 45, delete "invention;" and insert -- invention; and --, therefor.

In Column 3, Line 50, delete "DETAILS" and insert -- DETAILED --, therefor.

In Column 10, Line 26, in Claim 10, delete "claim 9" and insert -- claim 9, --, therefor.

Signed and Sealed this
Second Day of October, 2012

David J. Kappos
*Director of the United States Patent and Trademark Office*